Aug. 6, 1968 L. PATRIGNANI 3,396,288
ELECTRIC MOTOR HAVING A FRUSTO-CONICAL ROTOR PORTION
Filed Dec. 4, 1964 4 Sheets-Sheet 1

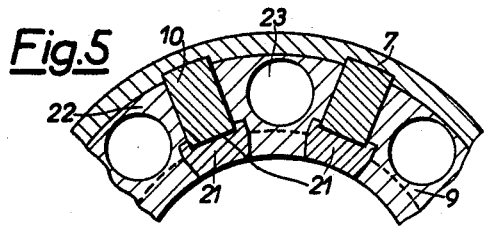
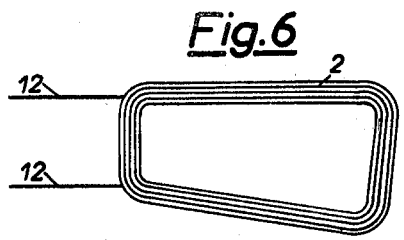
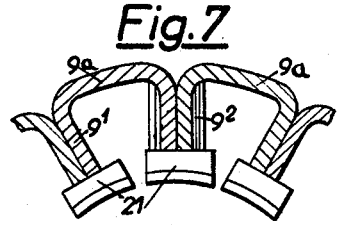
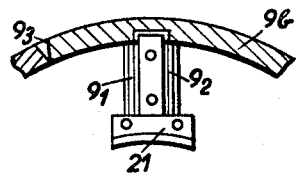
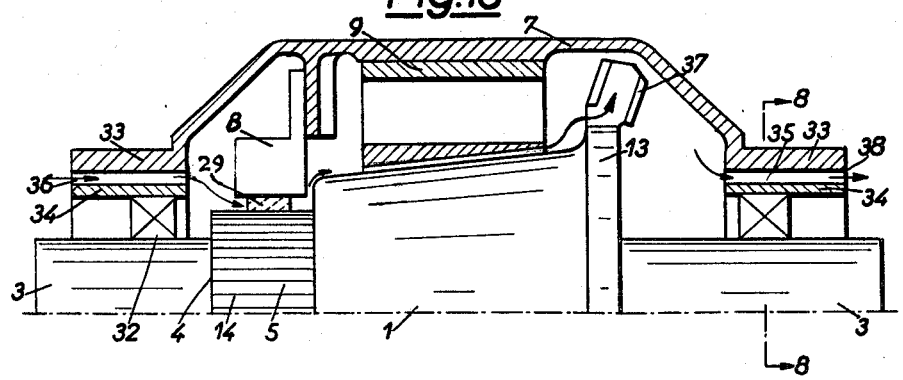
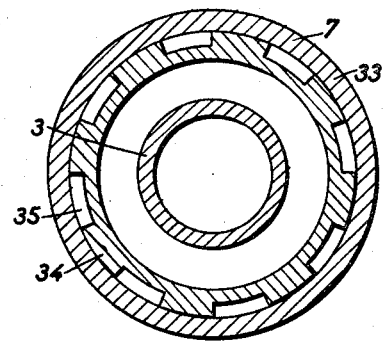
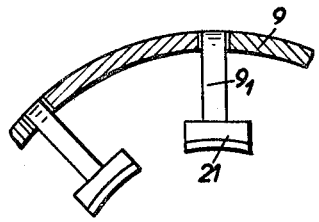

Aug. 6, 1968   L. PATRIGNANI   3,396,288
ELECTRIC MOTOR HAVING A FRUSTO-CONICAL ROTOR PORTION
Filed Dec. 4, 1964   4 Sheets-Sheet 3

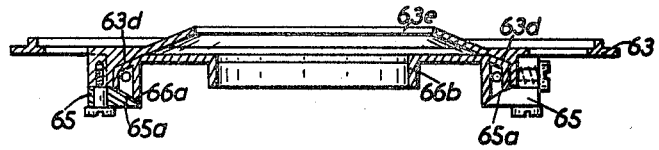
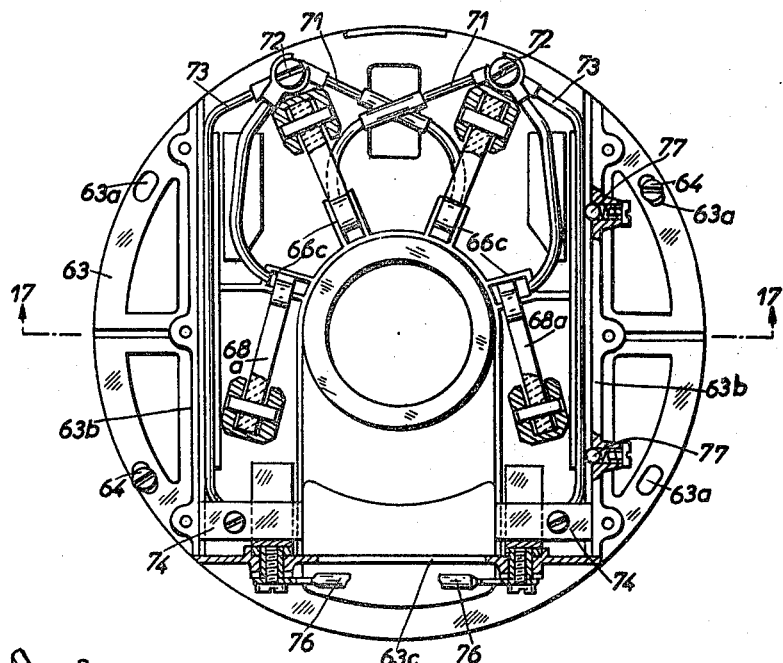
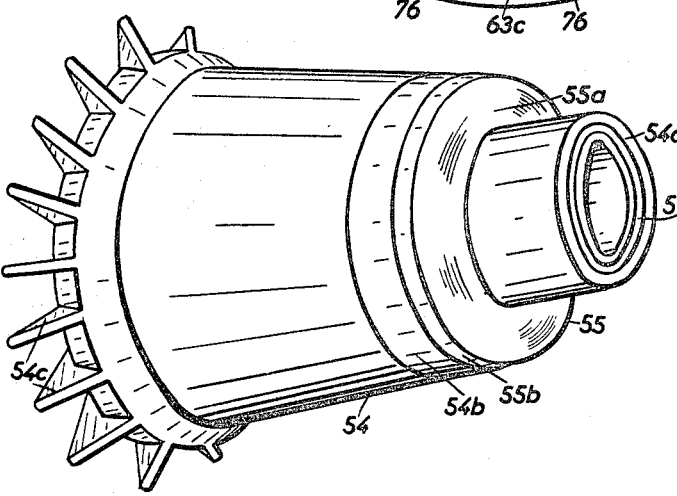

United States Patent Office 3,396,288
Patented Aug. 6, 1968

3,396,288
ELECTRIC MOTOR HAVING A FRUSTO-
CONICAL ROTOR PORTION
Leonida Patrignani, Florence, Italy, assignor to Manufacture de Vilebrequins de Lorette (Mavilor), Lorette, Loire, France
Filed Dec. 4, 1964, Ser. No. 415,909
Claims priority, application France, Dec. 13, 1963, 957,100
14 Claims. (Cl. 310—43)

ABSTRACT OF THE DISCLOSURE

A low inertia, high speed electric motor is provided with a frusto-conical rotor of synthetic resin. The rotor includes a conical portion encompassing the rotor windings and a cylindrical portion encompassing the collector blades. The motor also includes a stator portion surrounding said rotor portion and a magnetic member mounted inside said rotor portion to provide a magnetic circuit passing through said rotor windings. The frusto-conical shape of the rotor permits ready adjustment of the air gap by longitudinal displacement of the rotor between the stator and the magnetic member.

---

This invention relates to electrical machines, for example to electrical commutator motors which are possibly required to function over a wide spread range and which are suitable for the control of the spindles of machine tools, and for electrical household apparatus, typewriters and calculating machines.

In accordance with the invention there is provided an electrical machine comprising: a frusto-conical rotor portion of synthetic resin; rotor windings embedded in said rotor portion; a stator portion surrounding said rotor portion; and a magnetic member mounted inside said rotor portion and at that side of said rotor windings remote from said stator portion to provide with said stator portion a magnetic circuit passing through said rotor windings.

For a better understanding of the invention and to show how the same may be carried into effect, reference will now be made, by way of example, to the accompanying drawings, in which:

FIGURE 5 shows, in section, a part of the stator of the motor of FIGURE 1;

FIGURE 6 shows a rotor coil of this motor;

FIGURES 7 to 9 illustrate, in a similar manner, further embodiments of stator construction.

FIGURE 10 shows, in axial half-section, a motor as illustrated in FIGURE 1 with cooling air circulation;

FIGURE 11 is a section on the line XI—XI of FIGURE 10;

FIGURE 15 shows, in a perspective view, an embodiment of the rotor having fins according to the embodiment of FIGURE 12;

FIGURE 16 is an assembly view of the brush-carrying device as seen from the line 16—16 of FIGURE 12; and FIGURE 17 is a section along the line 17—17 of FIGURE 16.

Figure 1:
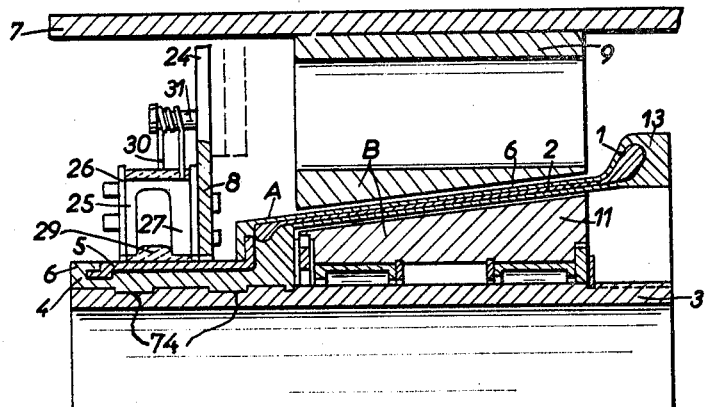
FIGURE 1 shows, as an axial half-section, with the housing partly removed, one embodiment of a D.C. electric commutator motor.
Figure 2:
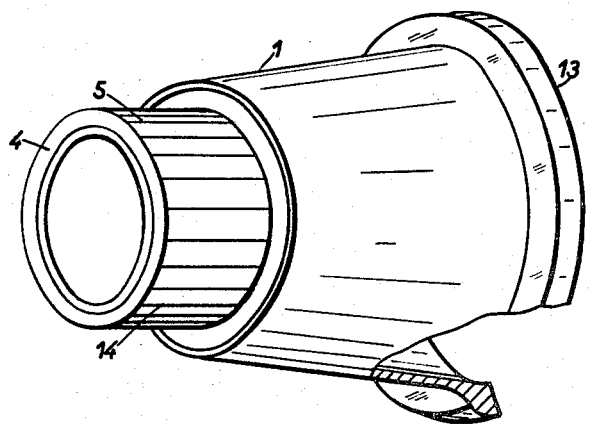
FIGURE 2 shows, in perspective with parts broken away, the rotor of the motor of FIGURE 1.

The D.C. commutator motor shown in FIGURES 1 and 10 is adapted to operate between 150 and 700 r.p.m. and comprise a rotor A and a stator B. The rotor A comprises a hollow body of synthetic resin having a frusto-conical portion 1 (FIGURE 2) in which is embedded the rotor winding 2 and having a cylindrical end portion providing a commutator 4 having blades 5 (FIGURE 2) also embedded in the synthetic resin. This rotor is secured on a sleeve 3. The rotor can also be made as a single piece without the sleeve, in which case reinforcement members, other than a sleeve, may be provided for the axial passage in the rotor.

Figure 3:
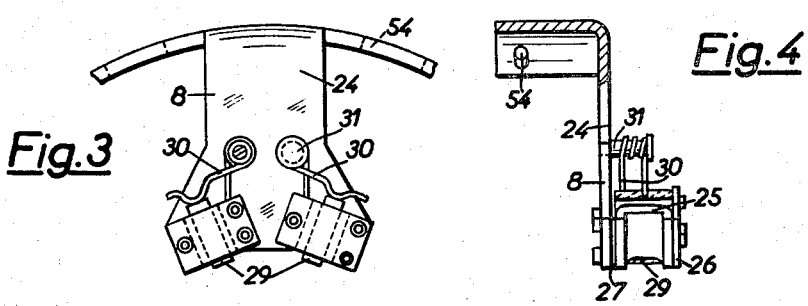
FIGURES 3 and 4 show, respectively, an end view and a side view of a brush-carrier of the motor of FIGURE 1.
Figure 4:
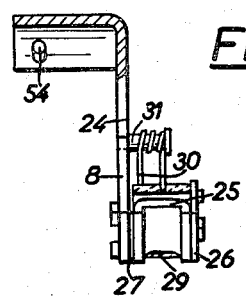

The stator B is secured within a housing 7 and has a brush-carrier 8 (FIGURES 3 and 4). A portion 9 of the stator which is external of the rotor 1 carries poles 10 (FIGURE 5). An inner portion 11 is freely mounted on the sleeve 3 or is fixed with respect to the housing 7.

The frusto-conical rotor portion 1 (FIGURE 2) the thickness of which is approximately 2 mm., contains the rotor coils 2 (FIGURE 6) made of copper connected to the blades 5 of the commutator 4 by conductors 12 embedded in the mass 6 of synthetic resin (for example an epoxy resin such as that known under the registered trademark "Araldite") which is an electrically insulating material and which is sufficiently strong mechanically for the present purposes. The frusto-conical shape of the rotor and its manufacture without ferromagnetic material ensures that it will have considerable lightness (with a low degree of inertia, thus permitting rapid modifications in the rotational velocity) and a high degree of rigidity, owing to its conical shape, that rigidity being increased still more by a peripheral ring 13. Furthermore, the conical shape of the rotor 1 permits ready adjustment of the air gap by longitudinal displacement of the rotor between the two portions 9 and 11.

The commutator 4 (FIGURES 1 and 2) is also of small thickness (of the order of half a centimeter) and does not contain any ferro-magnetic material so that it has low inertia. It comprises a series of copper blades 5 embedded in the same mass 6 of synthetic resin as the coils 2.

The metal sleeve 3 is secured to the rotor as the resin sets, owing to the grooves 74 formed on the outer curved surface of the sleeve. It is this rotating sleeve 3 which provides the transmission means for the torque to a member to be driven, such as a machine tool spindle. The fact that the sleeve is hollow permits the mounting of the member or spindle coaxially within the sleeve, this being advantageous, for example, for the manufacture of spindle motors (FIGURES 1 and 10).

It will thus be apparent that the rotating assembly consists of the part A which solidifies on the setting of the synthetic resin 6, the part A being centered and balanced on leaving the mould into which the resin is poured. The part A is furthermore extremely light and rigid in this example, so that a high rotational speed is possible as is the rapid variation of the speed.

The portion 9 of the stator (FIGURES 1 and 10), which is secured within the housing 7, is made of soft iron or of laminated sheet-metal. The required magnetic field is produced either by permanent magnets or by coils. In the latter case, the assembly of coils is advantageously made fast by embedding in a synthetic resin of the "Araldite" type. An embodiment involving the use of permanent magnets is illustrated in FIGURE 5; this figure shows radially disposed permanent magnets 10 carried on shoes or pole pieces 21 and also a mass 22 of embedding synthetic resin. The mass 22 is advantageously formed with longitudinal channels 23 the purpose of which is to receive magnetising filaments (not shown) suitable for bringing about the magnetisation of the magnets 11 and, where appropriate, for controlling the speed of the motor by producing an auxiliary magnetic field adding to or subtracting from the main magnetic field set up by permanent magnets 10.

The inner portion 11 (FIGURE 1) is manufactured, like the outer portion 9, from soft iron or laminated sheet-metal. It is mounted either freely on the sleeve 3 or is fixed with respect to the housing; in the first case, it will be possible to provide between the sleeve and the exterior of the rotor cone a wall improving the rigidity of the latter.

FIGURES 7 to 9 illustrate, by way of example, three further possible arrangements of the stator.

The embodiment of FIGURE 7 comprises the juxtaposition of U-shaped plates 9a (obtained by folding, profiling, calcination, etc.) in such manner that the limbs $9_1$ provide poles about which a coil system $9_2$ is formed. At the base of the limbs are pole pieces 21.

The embodiment of FIGURE 8 comprises a tube 9b, for example obtained by folding and welding at $9_3$, this tube carrying laminated plates $9_4$ and 21.

The embodiment according to FIGURE 9 is made in a similar manner, but the tube is replaced by cut and juxtaposed segments.

The various sheets or other materials of the magnetic circuit can be made from the materials usual for this purpose, preferably from ARMCO iron or from ferrite.

The brush-carrier (FIGURES 1, 3 and 4) is in this case of simple and inexpensive construction, being made from commercially-available parts. It consists of a support wall 24, adjustably secured as at 54 and carrying two U-shaped sections 25, each of which constitutes, with a metal plate 26 and an insulating plate 27, a cage for a brush 29. The facility of adjustment of the U-shaped irons permits sliding mounting of the brushes in their cages in an exact manner and without play. Two hairpin springs 30 mounted on pivots 31 secured on the wall 24 apply the brushes 29 under the required degree of pressure to the commutator 4.

The sleeve 3 of the rotor rotates in ball-type bearings 32 carried on the ends 33 of the housing 7 (FIGURES 10 and 11). These bearings bear on rings 34 formed with grooves 35 permitting the passage of cooling air. FIGURE 10 shows by means of arrows the circulation of the cooling air penetrating, at 36, through the grooves 35 in the left-hand ring 34, so as to cool the front bearing and the brushes 29, and then passing between the rotor 1 and the outer portion 9 of the stator, to enter the blading of a turbine arrangement 37 carried on the rotor ring 13 and which imparts movement to the air to cool the rear bearing. The air then flows out at 38 with a temperature which is approximately 5 to 10° higher than the ambient temperature of the air drawn in at 36.

An electrical motor of the type illustrated in the drawings has in fact been constructed and has the following characteristics:

| | |
|---|---|
| Number of poles | 8. |
| Number of commutator blades | 59. |
| Number of rotor coils | 59. |
| Number of turns per coil | 5. |
| Type of coil winding | Undulating. |
| Type of stator | Permanent-magnet type. |
| Intensity of the magnetic field in the air gap | 6,500 gauss. |
| External diameter of the stator | 230 mm. |
| Useful width | 75 mm. |
| Diameter of the commutator | 84 mm. |
| Diameter of the central bore | 60 mm. |
| Diameter of the pivot | 60 mm. |
| Total length with housing | 175 mm. |
| Output at 3000 r.p.m. | Higher than 30 volts. |
| Nominal voltage at 3000 r.p.m. | 130 volts. |

Figure 12:
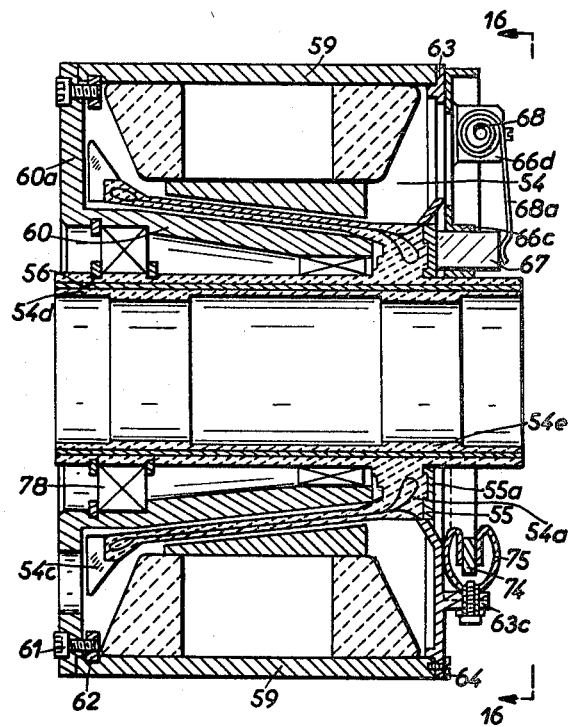
FIGURE 12 is an assembly view in axial section of a further embodiment of a D.C. commutator motor.

A further embodiment of motor is illustrated in FIGURE 12 which shows a frusto-conical rotor 54 having rotor windings 54a embedded in the insulating synthetic resin material 54b which forms a "monoblock" assembly with a commutator 55 of the flat or "front" type and having the general shape of a thin disc or washer. This type of commutator permits a lightening of the rotor portion of the rotor, a reduction in bulk in the axial direction, and a reduction of inertia.

It should be emphasized that the plastics moulding gives the commutator every freedom for expansion on two faces and in two directions, i.e. the front face 55a which is intended to contact the brushes described later, and the peripheral face 55b. Of course, the windings 54a can be connected in any known manner to the blades of the commutator 55.

At the other end of the rotor 54, the insulating embedding synthetic resin material 54b directly forms, by moulding, fins 54a which produce agitation of the air for ventilation and cooling. Thus, the ventilation arrangement is made integral with the rotor, simplifying manufacture and mounting.

If special working conditions require it, one can, of course, use supplementary ventilating means. On the other hand, the dynamic balancing of the finned motor may be achieved by the removal from and/or addition to the fins where required of material.

Referring again to FIGURE 12, the moulding of the rotor 54 is such as to provide an axially extending opening 54d which is integrally reinforced, for example, by a thin metal sleeve 56, or in some other manner such as by the provision of a metal net or rod. Inner bearing faces 54a for bearing on a central shaft may be formed by the insulating moulded material at the inside of the sleeve 54d.

FIGURE 12 shows a portion 59 of the stator disposed externally of the conical rotor and also an inner portion 60 for completing the magnetic circuit. In this case, the inner portion 60 is prolonged beyond the rotor by a wide collar 60a which is peripherally secured to the external fixed portion 59 by any desired assembly means such as screws 61 and support pieces 62 which are secured to the outer portion.

According to a further embodiment which it is unnecessary to illustrate, the inner iron portion is made integrally with the rotor to rotate therewith. This embodiment involves the manufacture of the inner iron from soft laminated iron, so as to eliminate disturbances.

Consequently, the inner portion providing a path for the field of the stator may be designed in three ways: (a) in such manner that it is free with respect to the stator and to the rotor and is mounted on antifriction bearings as shown in FIGURE 1; (b) in such manner that it is fixed and connected to the stator as illustrated in FIGURE 12; and (c) in such manner that it is integral with the rotor and consequently rotates therewith, this implying manufacture from soft laminated iron.

The anti-friction bearings for carrying the axial shaft may be mounted either on lateral flanges of the stator or within that inner portion which is provided to close the magnetic field when the inner portion is fixed to the stator (antifrication bearings 78 in FIGURE 12).

The difficulties involved in providing access to the brushes and in the adjustment, testing, cleaning and replacing of the brushes, such as are relatively frequently necessary are known. The embodiment of FIGURE 17 has been constructed with this in mind and is thus provided with a support 63 having slideways, and a brush-carrying slide 66, which parts are preferably manufactured from a moulded insulating material.

The support 63 (FIGURE 16) has a generally circular shape in order that it may be made fast with the fixed peripheral portion 59 of the stator to which it is secured by means of screws 64. The support 63 has, for this purpose, elongate apertures 63a for the passage of the screws so as to permit angular adjustment of the brush-carrying assembly to find the required commutation position.

The support 63 has parallel slideways 63b which are open at one end and are closed at the other end by a transverse partition 63c. Secured on the slideway 63b are retaining plates 65 the lower faces of each of which has an inclined edge 65a.

The support 63 has at its centre, a large circular aperture 63e permitting the free passage of the rotating axial sleeve 54d secured to the rotor, the arrangement being such that the front surface of the commutator 55 is entirely free for contact with brushes. The annular wall defining the aperture 63e is inclined to the plane of the support and extends to the immediate neighbourhood of the commutator 55 so as to retain the brushes when the slide is withdrawn.

Figure 14:
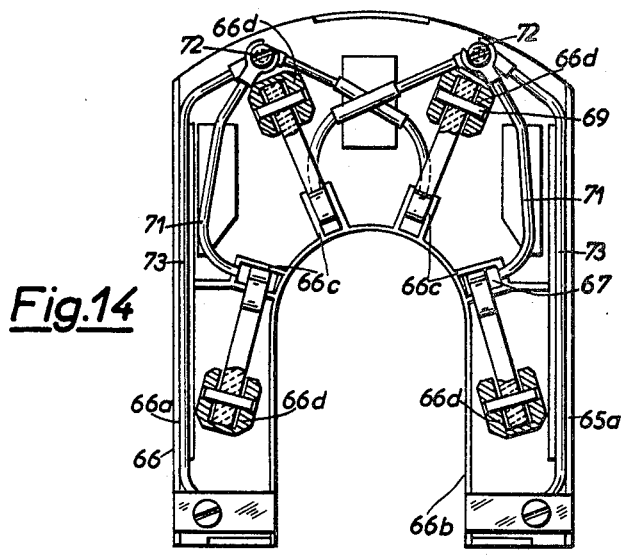
FIGURE 14 is an end view as seen from the line 19—19 of FIGURE 13.
Figure 13:
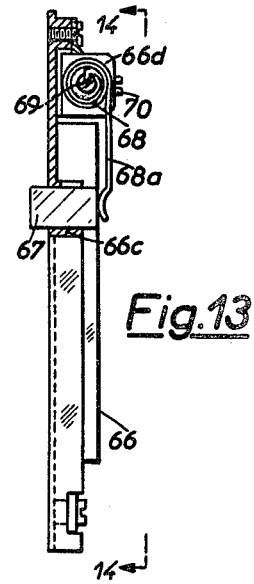
FIGURE 13 is a side view of the brush-carrying slide withdrawn from its support in the motor illustrated in FIGURE 12.

The brush-carrying slide 66 (FIGURE 14) is so designed and dimensioned that it can slide, by its edges having faces 66a, between the slideways 63b, bearing with the minimum necessary and adjustable degree of clearance between the inclined faces 65a of the plate 65 and the inclined faces 63d at the base of the slideway 63b.

The slide has an axial opening at 66b, so that it can be freely disposed about the sleeve 54d. The slide has seatings 66c which are appropriately positioned and the bottom of each of which is open and in which are disposed the brushes 67 which bear against the commutator 55.

The illustrations show four seatings and four brushes in the example illustrated in the drawings, but it will be clear that this number is only an example.

Each brush 67 is firmly and resiliently supported against the commutator by the free part 68a of the respective blade spring 68 spirally wound on a pivot 69 mounted between bearing faces 66d. The inner end of each spring blade 68 is secured on the pivot 69 and the latter is secured relatively to the bearing faces 66d, for example by means of screws 70, in such manner as to be adjustable to obtain the appropriate pressure necessary on each of the brushes 67 in the direction of the commutator 55.

The necessary connections are provided by means of conductors 71 alternately connecting the brushes to a pair of terminals 72 from which conductors 73 extend to contact blades or members 74. The blades 74 are fixed near that end of the slide which, during the assembly, approaches the partition 63c of the support. The partition 63c carries resilient gripper members 75 which are doubly folded and between which the blades 74 engage frictionally. Conductors 76 are connected to the gripper members 75.

When the slide is in position, continuity of the electrical circuit is directly attained, whilst at the same time makng it possible to withdraw the brush-carrying slide instantly and at will.

The slide 66 is accurately positioned between the slideways 63b, for example by means of ball and spring systems 77 mounted in the slideways 63b and co-operating with conical centering depressions or the like formed at the edges 66a of the slide. Depending on the assembly conditions, the possibilities for access, etc., locking screws can if required be screwed into the slideways 63b as to lock the slide in its assembly position.

The importance of these arrangements will be clear, in particular owing to the possibility of rapidly interchanging of the brushes by dismantling the slide which can immediately be replaced by a further standard slide equipped with brushes. It then becomes possible to proceed with the testing, the replacement, cleaning and pressure regulation of the brushes with considerable precision, since the necessary time is available and work can be done in comfort without stopping the motor.

What is claimed is:

1. An electric motor of the brush and collector type comprising a rotary part constituted by a rotor, including induction windings and collector blades embedded in a body of synthetic resin plastic material, and a stationary part constituted by a housing, a brush support, a fixed stator portion outside the rotor, a further stator portion inside the rotor, and induction pole pieces supported by the fixed portion, wherein the rotor includes a conical portion encompassing the induction windings and a cylindrical portion encompassing the collector blades, and a sleeve inside the body of plastic material rigidly secured thereto and extending co-axially therein at least co-extensively with the rotor.

2. A motor as in claim 1 further comprising bearings for supporting both the rotor and sleeve and a work spindle extending through the sleeve and driven by the motor.

3. A motor as in claim 2 wherein the further stator portion inside the rotor is free on the sleeve, and further comprising a reinforcing wall between the sleeve and the end of the rotor.

4. A motor as in claim 1 further comprising means defining central notches inside the collector blades anchoring the blades in the body of plastic material, said blades being free to expand radially.

5. A motor as in claim 1 wherein the collector defines a brush contacting surface of annular configuration at the exposed end face thereof, the cylindrical collector portion of the rotor being connected to the conical portion of the rotor at the smaller end thereof, and the diameter of the collector portion being at most equal to that of said small end.

6. A motor as in claim 1 wherein the brush support comprises a radially movable brush holder, a brush supported therein, and spring means urging the brush into contact with the end face of the cylindrical portion of the rotor.

7. A motor as in claim 1 wherein the body of plastic material encompassing the induction windings, of the rotor at the larger end thereof, opposite to the smaller end encompassing the collector blades, defines ventilating and cooling blades.

8. A motor as in claim 7 wherein the housing defines passages and openings between the brushes and between the two stator portions, and further comprising a turbine mounted on the freely rotatable further stator portion.

9. A motor as in claim 1 wherein the brush support comprises a frame defining slide-ways, said frame being secured to the outside stator portion, and movable brush slides readily and rapidly insertable in and removable from the slide-ways, said slides and frame being of molded insulating material.

10. A motor as in claim 9 further comprising adjustable means securing the frame to the outside stator portion for accurate adjustment of the commutation plane of the collector and brushes, adjustable spring means urging the brush slides toward the collector, contact blades electrically connecting the brushes continuously in circuit with terminals on the frame in each adjusted position of the brush slides in the slide-ways, and accurate positioning means for securing the slides in the slide-ways.

11. A motor as in claim 9 wherein the slide-ways and slides have oppositely inclined mating contact surfaces with adjustable sliding clearance.

12. A motor as in claim 9 further comprising spring-ball means for positioning and securing the brush slides on the frame.

13. A motor as in claim 1 wherein the collector defines a brush contacting surface of cylindrical configuration.

14. A motor as in claim 1 wherein the collector defines a brush contacting surface of planar configuration on the exposed end face of said collector.

(References on following page)

References Cited

UNITED STATES PATENTS

| | | | |
|---|---|---|---|
| 422,862 | 3/1890 | Washburn | 310—209 |
| 1,363,644 | 12/1920 | Dobson | 310—171 |
| 2,759,116 | 8/1956 | Glass | 310—237 |
| 2,831,991 | 4/1958 | Perkins | 310—43 |
| 2,832,908 | 4/1958 | Abbott | 310—191 |
| 3,102,964 | 9/1963 | Bennett | 310—43 |

FOREIGN PATENTS 902,557  8/1962  Great Britain.

MILTON O. HIRSHFIELD, *Primary Examiner.*

G. NUNEZ, *Assistant Examiner.*